United States Patent
Hoffmeister

(10) Patent No.: US 9,159,319 B1
(45) Date of Patent: Oct. 13, 2015

(54) KEYWORD SPOTTING WITH COMPETITOR MODELS

(71) Applicant: Amazon Technologies, Inc., Reno, NV (US)

(72) Inventor: Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 13/692,775

(22) Filed: Dec. 3, 2012

(51) Int. Cl.
*G10L 15/22* (2006.01)

(52) U.S. Cl.
CPC ...................................... *G10L 15/22* (2013.01)

(58) Field of Classification Search
CPC ..... G10L 15/265; G10L 15/063; G10L 15/10; G10L 15/144; G10L 2015/088
USPC ........................ 704/231, 235, 244, 251–256.8
See application file for complete search history.

(56) References Cited

U.S. PATENT DOCUMENTS

| | | | |
|---|---|---|---|
| 5,737,489 A * | 4/1998 | Chou et al. ..................... | 704/256 |
| 5,897,616 A * | 4/1999 | Kanevsky et al. ............ | 704/246 |
| 6,208,964 B1 * | 3/2001 | Sabourin ....................... | 704/244 |
| 7,031,923 B1 * | 4/2006 | Chaudhari et al. ............ | 704/273 |
| 7,337,116 B2 * | 2/2008 | Charlesworth et al. ....... | 704/254 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,438,027 B2 * | 5/2013 | Teranishi et al. ............. | 704/243 |
| 8,751,226 B2 * | 6/2014 | Yamamoto et al. ........... | 704/231 |
| 2004/0236577 A1 * | 11/2004 | Nishitani et al. .............. | 704/256 |
| 2007/0174055 A1 * | 7/2007 | Chengalvarayan et al. .. | 704/251 |
| 2010/0161334 A1 * | 6/2010 | Kang et al. .................... | 704/251 |
| 2011/0264507 A1 * | 10/2011 | Zhou et al. ................. | 705/14.42 |
| 2012/0054054 A1 * | 3/2012 | Kameyama ................... | 705/26.1 |
| 2012/0072221 A1 * | 3/2012 | White et al. .................. | 704/251 |

* cited by examiner

*Primary Examiner* — Douglas Godbold
(74) *Attorney, Agent, or Firm* — Knobbe, Martens, Olson & Bear, LLP

(57) ABSTRACT

Keyword spotting may be improved by using a competitor model. In some embodiments, audio data is received by a device. At least a portion of the audio data may be compared with a keyword model to obtain a first score. The keyword model may model a keyword. The portion of the audio data may also be compared with a competitor model to obtain a second score. The competitor model may model a competitor word, which may be a word that is similar to the keyword. The device may compare the first score and the second score to determine if a keyword is spoken.

32 Claims, 7 Drawing Sheets

KEYWORD SPOTTING WITH COMPETITOR MODELS

BACKGROUND

Computing devices are commonly used to help users perform any of a variety of desired tasks. In some cases, the computing devices control equipment that is able to perform the desired task. For example, some computing devices are configured to turn on or off a light switch, adjust playback on an audio device, initiate a call on a mobile handset, adjust the temperature of an air conditioning unit, and the like. Voice control of such computing devices may be particularly helpful and convenient by allowing a user to perform a task without having to use his or her hands, or physically activate physical elements of a user interface (e.g., switches, keyboards, buttons, etc.). In some cases, computing devices with voice control listen for one or more keywords before performing the desired task. For example, a computing device may listen for the keywords "lights on" or "lights off" to turn on or off a light switch, "play song" to activate an audio player, "call" to initiate a phone call, "increase temperature" or "decrease temperature" to control an air conditioning unit, and the like.

Generally, such computing devices identify a keyword using various models that include information relevant to the control of particular devices. Such models can include a keyword model and a background model. The keyword model can include a sequence of one or more states (e.g., hidden Markov model (HMM) states, etc.) that together represent the keyword. Comparing an utterance with the keyword model (e.g., by aligning feature vectors derived from the portion with the states of the keyword model, or other process, as described below) yields a score that represents how likely the utterance corresponds with the keyword. Similarly, the background model can include a sequence of one or more states that together represent words other than the keyword, as described further below. Comparing the utterance with the background model (e.g., by aligning feature vectors derived from the utterance with the states of the background model, or other process, as described below) yields a score that represents how likely the utterance corresponds with a generic word. The computing device can compare the two scores to determine whether the keyword was spoken.

In some cases, this approach adequately identifies keywords. For example, a word that is clearly different than the keyword is unlikely to be identified as the keyword because the degree of similarity between the word and the keyword may be greater than the degree of similarity between the word and keyword generic word. However, in other cases, the computing device will falsely identify certain words as a keyword. For example, a word that is acoustically similar to the keyword might be erroneously identified as a keyword when the degree of similarity between the word and a generic word is greater than the degree of similarity between the word and the keyword.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Introduction

Figure 1:
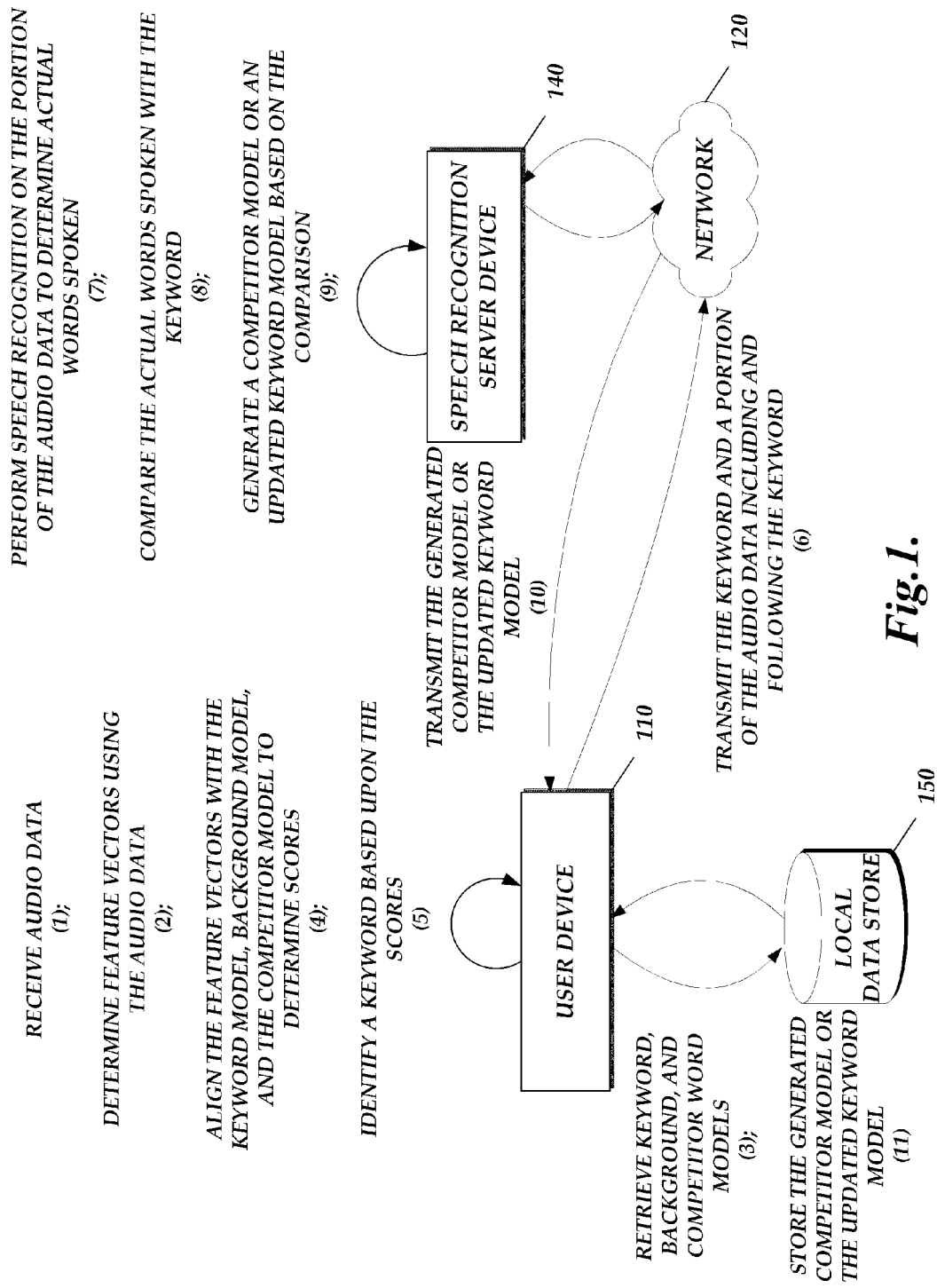
FIG. 1 is a state diagram depicting a device performing keyword spotting using competitor models and a speech recognition server device generating word models in an illustrative network environment.

A user device configured to use a keyword model, a background model (e.g., a universal background model (UBM)), and/or one or more competitor models (as described below) may improve keyword spotting accuracy. Conventional user devices configured to perform voice-activated control identify keywords using a keyword model and a background model. For example, such devices compare an utterance with the keyword model to determine a first score that represents a degree of similarity between the utterance and the keyword (e.g., the first score represents a likelihood that the utterance corresponds with the keyword). Such devices also compare the utterance with the background model to determine a second score that represents a degree of similarity between the utterance and a generic word (e.g., the second score represents a likelihood that the utterance corresponds with a generic word). Conventional user devices compare the two scores to determine whether a keyword was spoken.

However, comparing just two scores can frequently cause such user devices to erroneously identify a non-keyword as a keyword, particularly when the non-keyword is similar (e.g., acoustically similar) to the keyword. For example, non-keyword "tight" and keyword "light" are acoustically similar. When comparing an utterance corresponding to the non-keyword "tight" with the keyword model and the background model, the conventional user device may erroneously determine that the utterance is more likely to correspond with the keyword "light" than the background model. Accordingly, it is desirable to construct and utilize an automatic speech recognition (ASR) system that identifies such non-keywords words that are similar to keywords, creates models for these similar words (sometimes referred to as "competitor models"), and compares utterances with the created models to produce additional points of comparison during the keyword spotting process.

Such an ASR system may include a user device and a speech recognition server device. The user device compares an utterance with the keyword model and the background model. Additionally, the user device compares the utterance with one or more competitor models created by the speech recognition server device. Comparing the utterance with a competitor model may produce a score that indicates how likely the utterance corresponds with a competitor word. The user device compares the scores produced by the keyword model, the background model, and the one or more competitor models to determine whether a keyword is spoken.

In some cases, it may be desirable to determine the keyword spotting accuracy and refine the keyword spotting process. Thus, if the user device determines that a keyword is spoken, a portion of the utterance corresponding to the possible keyword (and optionally surrounding portions of the utterance) may be transmitted to the speech recognition server device. The speech recognition server device performs speech recognition on the received utterance and determines whether the keyword was actually spoken. If the keyword was spoken, the speech recognition server device may generate an updated keyword model. The speech recognition server device sends the updated keyword model to the user device for use in place of the original keyword model during subsequent keyword spotting. If the keyword was not spoken, the speech recognition server device may generate a competitor word model for the word mistakenly identified as the keyword. The speech recognition server device sends the competitor model to the user device for use during subsequent keyword spotting. Situations in which an updated keyword model or a new competitor model is generated are described in greater detail below.

Generally, a competitor word may be any word that would be assigned a higher score by the keyword model than the background model. In particular, the competitor word may be a word that is acoustically similar to the keyword. For example, a competitor word may differ from the keyword by a consonant, vowel, syllable, phoneme, or other type of subword unit. A competitor model may comprise a sequence of one or more states (e.g., hidden Markov model (HMM) states, etc.) that together represent the competitor word (e.g., that represent the subword units of the competitor word, an arbitrary portion of the competitor word, etc.).

In some embodiments, the keyword and/or competitor words may each correspond to a single word. In other embodiments, the keyword and/or competitor words may each correspond to a phrase of words. For simplicity in the description below, keyword spotting will be demonstrated with the keyword and the competitor words each corresponding to a single word, and the extension to phrases is straightforward.

The use of one or more competitor models may improve keyword spotting by creating additional points of comparison. Instead of comparing two scores to determine whether a keyword was spoken, the user device may compare a plurality of scores. In some cases, especially for competitor words, the scores produced by the competitor models may be higher than the scores produced by the keyword model. This may reduce the number of times that a word is falsely identified as a keyword.

The use of competitor models for keyword spotting may be used in any environment where keyword spotting is used. For example, in some embodiments, keyword spotting may be performed by a computer on archived audio data, keyword spotting may be performed by a server using audio received from a client, or keyword spotting may be performed by a user device, such as a personal computer or a smart phone. In the following example, keyword spotting will be demonstrated with a user device and a server device but any other keyword spotting environment may be used as well.

FIG. 1 illustrates a state diagram depicting a user device 110 and a speech recognition server device 140. The user device 110 is shown performing keyword spotting using competitor models. The speech recognition server device 140 is shown generating word models. The user device 110 and the speech recognition server device 140 communicate with each other in an illustrative network environment. As illustrated in FIG. 1, a user device 110 may receive audio data (1) and compute feature vectors using the audio data (2). The feature vectors may represent characteristics of the audio data. As described below, the feature vectors may be compared with models to produce scores. At a same or different time, a keyword model, a background model, and/or a competitor model may be retrieved (3) from a local data store 150.

The audio data may be compared with the keyword and background models to produce a first score and a second score, respectively. Specifically, the feature vectors computed from the audio data may be mapped or aligned with the states of the keyword and background models to produce the first score and second score, respectively (4). In some embodiments, the keyword and background models include a sequence of one or more states. The states may be HMM states for a group of subword units (e.g., phonemes). For example, the keyword model may include a sequence of one or more HMM states for the subword units that comprise the keyword. The background model may include a sequence of one or more HMM states for a broad group of subword units (e.g., all the subword units of a given language). If the background model includes one state, the background model may be referred to as a single, universal background model (UBM). If the background model includes multiple states, the background model is a finer model for representing background sounds and information (e.g., a speech and a non-speech model, a phone model, etc.). The states may also be HMM states for an arbitrary portion of a word, such as the keyword. The HMM states may be represented by Gaussian mixture models (GMMs) that model distributions of feature vectors.

Generally, the background model may be estimated from training data or derived from an existing model. For example, a UBM may be derived using a standard GMM-based acoustic model. The standard GMM-based acoustic model may include a GMM for each subword unit (e.g., phone, triphone, etc.) in a broad group of subword units (e.g., all the subword units of a given language). The UBM may be derived by merging some or all of the GMMs of the standard GMM-based acoustic model into a single GMM and clustering the Gaussians in the single GMM to a desired number of Gaussians (e.g., clustering the Gaussians in the single GMM to a smaller number of Gaussians).

Mapping or aligning feature vectors computed from the audio data with the HMM states yields the likelihood that the HMM states gave rise to the feature vectors computed from the audio data. These likelihoods may be represented as the first score when aligning the feature vectors with the HMM states of the keyword model and the second score when aligning the feature vectors with the HMM states of the background model. The user device 110 may perform the mapping or alignment using a Viterbi algorithm or any other technique known to one of skill in the art.

The user device 110 may compare the first and second scores. If the comparison suggests that the likelihood that the HMM states of the keyword model gave rise to the feature vectors is greater than the likelihood that the HMM states of the background model gave rise to the feature vectors (e.g., the first score is greater than the second score), then the user device 110 may compare the audio data with a competitor model (discussed below) to produce a third score. Like the keyword model, the competitor model may include a sequence of one or more HMM states for the subword units that comprise the competitor word. Thus, the user device 110 may map or align the feature vectors computed from the audio data with the HMM states of the competitor model to produce the third score.

The user device 110 may then compare the first and third scores. If the comparison suggests that the likelihood that the HMM states of the keyword model gave rise to the feature vectors is greater than the likelihood that the HMM states of the competitor model gave rise to the feature vectors (e.g., the first score is greater than the third score), then the user device 110 may continue comparing the audio data with any remaining competitor models. If all comparisons suggest that the likelihood that the HMM states of the keyword model gave rise to the feature vectors is greater than the likelihood that the HMM states of any remaining competitor model gave rise to the feature vectors (e.g., the first score is greater than the scores produced by the remaining competitor models), then the user device 110 may determine that it has identified a keyword (5).

In some embodiments, the user device 110 may determine the first score for the keyword model, the second score for the background model, and the other scores for the competitor models at the same time or nearly the same time. For example, it may be preferred to compute the scores simultaneously to reduce the latency in determining whether an utterance corresponds to the keyword.

Upon making the determination that the utterance corresponds to the keyword, the user device 110 may perform an operation associated with the keyword. On the other hand, if any comparison suggests that the likelihood that the HMM states of the keyword model gave rise to the feature vectors is less than the likelihood that the HMM states of a competitor model gave rise to the feature vectors (e.g., the first score is less than the third score or any subsequent score produced by a competitor model), then the user device 110 may determine that it has not identified a keyword.

Competitor models may be generated remotely by the speech recognition server device 140. For example, if the user device 110 identifies a keyword, the keyword and a portion of the audio data surrounding the keyword may be transmitted from the user device 110 to the speech recognition server device 140 (6) via network 120. The speech recognition server device 140 may perform speech recognition on the received portion of the audio data to obtain a more accurate estimate of the words spoken by the user (7). In some embodiments, a person may review the audio to determine the actual words spoken by the user. In some embodiments, user actions may be used to verify whether the words spoken by the user correspond to the keyword. For example, where the words are recognized as the keyword "lights on" and the user immediately responds with "lights off," it may be inferred that recognition of "lights on" was incorrect.

In an embodiment, the speech recognition server device 140 compares the recognized words (or the actual words where received by a person) with the keyword (8) and generates a competitor model or an updated keyword model based on the comparison (9). For example, the speech recognition server device 140 may determine whether any of the recognized words match the keyword or whether any of the recognized words are similar (e.g., acoustically similar) to the keyword. If the speech recognition server device 140 determines that one of the recognized words is similar to the keyword, the speech recognition server device 140 may store the similar word in a list of possible competitor words. In an embodiment, the list is adapted to a particular user or a particular user device 110. During subsequent speech recognition, the speech recognition server device 140 may track how often the similar word is falsely identified as a keyword by the user device 110. Once the similar word appears a predetermined number of times at a given confidence level, the speech recognition server device 140 may generate a new competitor model. The new competitor model includes a sequence of one or more HMM states that represent the similar word (e.g., that represent the subword units of the similar word, an arbitrary portion of the similar word, etc.). The new competitor model may be transmitted to the user device 110 (10) and stored in the local data store 150 (11) for use during subsequent keyword spotting.

If the speech recognition server device 140 determines that one of the recognized words matches the keyword, the speech recognition server device 140 may compare the pronunciations of the matching word and the keyword. If there is any discrepancy in the pronunciations of the matching word and the keyword, the speech recognition server device 140 may generate an updated keyword model based on the pronunciation of the matching word. The updated keyword model may be transmitted to the user device 110 (10) and stored in the local data store 150 (11) for use in place of the old keyword model during subsequent keyword spotting.

System Setup—User Device and Cloud Device

Figure 2:
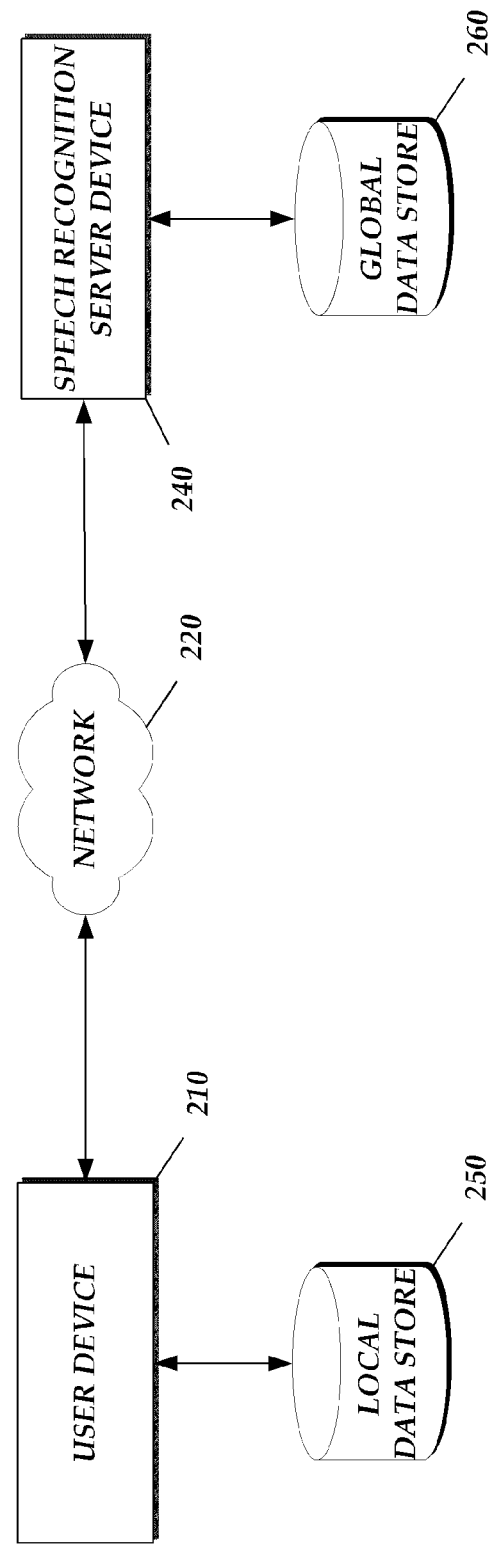
FIG. 2 is a system diagram depicting a user device and a speech recognition server device in an illustrative network environment.

FIG. 2 illustrates a system diagram depicting a user device 210 and a speech recognition server device 240 in an illustrative network environment 200. In some embodiments, the network environment 200 includes the user device 210, a network 220, the speech recognition server device 240, a local data store 250, and/or a global data store 260.

The user device 210 may be configured to perform keyword spotting. For example, the user device 210 may receive an utterance and compute feature vectors derived from the utterance. As described above, the user device 210 may map or align the feature vectors with states of a keyword model, a background model, and/or one or more competitor models to determine a set of scores. The scores may represent how likely the utterance corresponds with a keyword, a generic word, and/or one or more competitor words. The user device 210 may determine whether a keyword is spoken based on a comparison of the scores. In some embodiments, if a keyword is identified, the user device 210 may forward the keyword and a portion of the utterance corresponding to the keyword to the speech recognition server device 140 via the network 120, as described below.

In further embodiments, the user device 210 may be configured to perform an operation if a keyword is identified. In particular, the user device 210 may control another device or equipment, not shown, to perform the operation. For example, the user device 210 may toggle a light switch if the keywords "lights on" or "lights off" are identified, activate an audio player if the keywords "play song" are identified, initiate a phone call if the keyword "call" is identified, and the like.

In an embodiment, the user device 210 is a computing device. For example, the user device 210 may be an electronic device, such as a cell phone, a smart phone, a tablet, a laptop, a personal digital assistant (PDA), a computer, a desktop, a workstation, an electronic book reader, a set-top box, a camera, an audiobook player, a digital media player, a video game console, a server, a terminal, a kiosk, a clock, or the like. The user device 210 may include a microphone, a speaker, a wireless module, a camera, and/or a display. In another embodiment, the user device 210 is a module or application that is executed by another device. The user device 210, when configured as a keyword spotting device, is described in greater detail with respect to FIG. 7, below.

The user device 210 may be in communication with a local data store 250. The local data store 250 may store a keyword model, a background model, and/or one or more competitor models. As discussed above, the keyword model may include a sequence of one or more HMM states for the keyword. The background model may include a sequence of one or more HMM states for a broad group of subword units (e.g., all the subword units of a given language). A competitor model may include a sequence of one or more HMM states for the competitor word. HMM states are described in greater detail below with respect to FIG. 3. In some embodiments, the local data store 250 is a single data store. In other embodiments, the local data store 250 is distributed over many different locations.

As discussed above, the user device 210 may also be in communication with the speech recognition server device 240 directly or through a network 220. The network 220 may be a wired network, a wireless network, or a combination of the two. For example, the network 220 may be a personal area network, a local area network (LAN), a wide area network (WAN), or combinations of the same. Protocols and components for communicating via any of the other aforementioned types of communication networks, such as the TCP/IP protocols, can be used in the network 220.

In some embodiments, the speech recognition server device 240 is configured to perform speech recognition and generate an updated keyword model or a competitor model based on the speech recognition results. For example, the speech recognition server device 240 receives the keyword and an utterance from the user device 210. The speech recognition server device 240 may perform speech recognition on the utterance and compare the keyword with the speech recognition results (e.g., compare the keyword with a lattice of words, etc.).

If the keyword matches a word in speech recognition results (e.g., in a lattice of words generated by the speech recognition processor), the speech recognition server device 240 may determine whether there is any discrepancy between the pronunciation of the keyword and the pronunciation of the matching word in the lattice. The speech recognition server device 240 generates an updated keyword model based on the matching word if there is a difference in pronunciations. The difference in pronunciations may be identified automatically by the speech recognition server device 240 or manually by a person. Once generated, the speech recognition server device 240 transmits the updated keyword model to the user device 210 via the network 220.

If a word in the lattice of words is similar to the keyword, the speech recognition server device 240 may store the word in an electronic data store, such as the global data store 260. In an embodiment, the entry in the global data store 260 may be associated with the user device 210 or the user of the user device 210. The speech recognition server device 240 may generate a competitor model based on the stored word if the stored word is often falsely identified as the keyword by the user device 210. For example, the competitor model is generated if the stored word is falsely identified as the keyword a predetermined number of times at a confidence level that exceeds a predetermined value. Once generated, the speech recognition server device 240 transmits the competitor model to the user device 210 via the network 220.

In other embodiments, not shown, the speech recognition server device 240 generates a competitor model based on a list of competitor words supplied by another device, such as the user device 210. In an embodiment, a list of competitor words is compiled by applying linguistic knowledge. For example, the list includes words that differ in pronunciation from a keyword by one subword unit (e.g., one consonant). If the keyword is "Ryan," words that differ in pronunciation from the keyword by one subword unit could include "Brian," "prion," "lion," or the like. In another embodiment, the list of competitor words is produced by running the keyword spotter on a large corpus of text. For example, the user device 210 may perform keyword spotting on the large corpus of text and identify those words that were falsely classified as the keyword. The words that were falsely classified as the keyword could be included on the list.

The speech recognition server device 240 may be a computing device. For example, the speech recognition server device 240 may include one or more processors to execute one or more instructions, memory, and communication devices to transmit and receive data over the network 220. In some embodiments, the speech recognition server device 240 is implemented as one or more backend servers capable of communicating over a network. In other embodiments, the speech recognition server device 240 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech recognition server device 240 may be represented as a user computing device capable of communicating over a network, such as a laptop or tablet computer, personal computer, personal digital assistant (PDA), hybrid PDA/mobile phone, mobile phone, global positioning system (GPS) device, or the like.

While FIG. 2 illustrates a single user device 210, the speech recognition server device 240 may be in communication with a plurality of user devices 210. Likewise, while FIG. 2 illustrates a single speech recognition server device 240, the user device 210 may be in communication with a plurality of speech recognition server devices 240.

As described above, the speech recognition server device 240 may be in communication with the global data store 260. The global data store 260 may store words that have been falsely identified as keywords and the corresponding audio data. The corresponding audio data may be used for updating the keyword model or creating competitor models. The global data store 260 may also store a number of times each word has been falsely identified as a keyword and one or more confidence scores for each stored word. Each confidence score represents a confidence by the speech recognition server device 240 that the speech recognition results are correct.

In an embodiment, the global data store 260 includes separate entries associated with each user and/or each user device 210. Words falsely identified as the keyword by a given user device 210 may be stored in the entry associated with the given user device 210. In some embodiments, the stored words may include those words for which the speech recognition server device 240 has not yet created a competitor model. If the speech recognition server device 240 generates a competitor model based on a stored word, the stored word is removed from the global data store 260. The global data store 260 may be accessible by one or more speech recognition server devices 240. In some embodiments, the global data store 260 is a single data store. In other embodiments, the global data store 260 is distributed over many different locations.

Hidden Markov Model States

Figure 3:
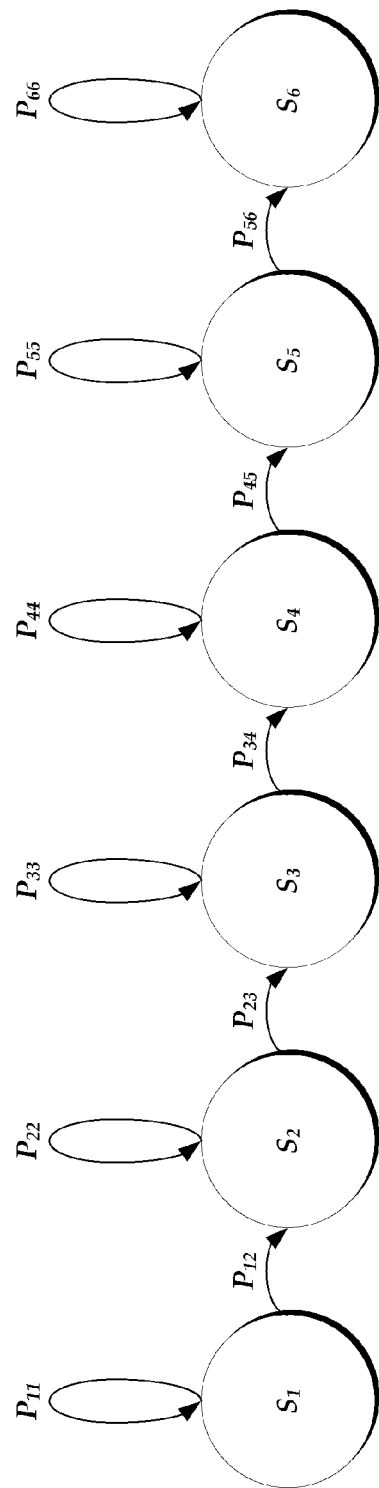
FIG. 3 is an example sequence of hidden Markov model (HMM) states included in a word model.

FIG. 3 illustrates an example sequence 300 of hidden Markov model (HMM) states that may be included in a word model, such as a keyword model, a background model, and/or a competitor model. As illustrated in FIG. 3, the sequence 300 includes six HMM states: $S_1$ through $S_6$. While six HMM states are illustrated in FIG. 3, a word model may include any number of HMM states. As discussed above, each HMM state $S_1$ through $S_6$ may be represented by Gaussian mixture models (GMMs) that model distributions of feature vectors.

In some embodiments, one or more HMM states represent a subword unit (e.g., a phoneme or a phoneme in context). For example, HMM states $S_1$ through $S_3$ may represent a phoneme and states $S_4$ through $S_6$ may represent another phoneme.

Each HMM state $S_1$ through $S_5$ includes an arc extending to the next state in the sequence as well as an arc that transitions back to the same state. State $S_6$ includes an arc that transitions back to $S_6$. Each arc may include a state transition probability that indicates the probability that an HMM state at a current time is chosen given the HMM state chosen at a previous time. During the mapping or alignment of feature vectors to the HMM states $S_1$ through $S_6$, the state transition probabilities may be used to generate the word model score.

Keyword Spotting with Competitor Models

Figure 4:
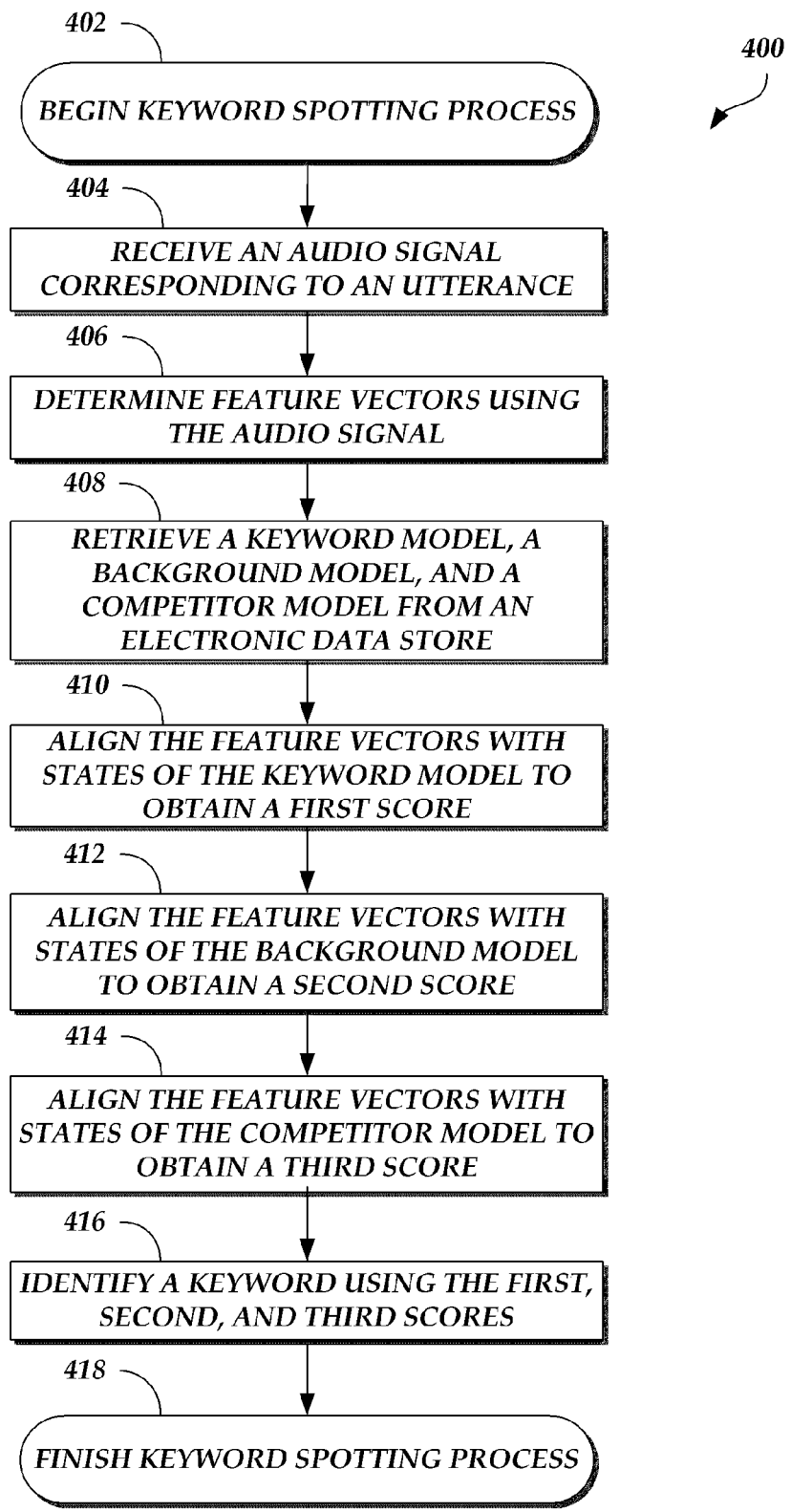
FIG. 4 is a flow diagram depicting an illustrative routine for performing keyword spotting.

As described above, a keyword spotting device, such as the user device 210, is configured to identify a keyword (e.g., keyword spotting). FIG. 4 illustrates a routine 400 for performing keyword spotting. A user device 210, as described herein with respect to FIGS. 2 and 7, may be configured to execute the routine 400. Likewise, a speech recognition server device 240, as described herein with respect to FIG. 2, may also be configured to execute the routine 400. The routine 400 begins at block 402. The routine 400 may be an interactive routine initiated on demand by a user or an automated routine, such as might be executed on a periodic or aperiodic schedule. At block 402, the routine 400 begins the keyword spotting process.

At block 404, an audio signal corresponding to an utterance is received. The utterance may be received for the purposes of performing an operation. At block 406, feature vectors are determined using the audio signal. The feature vectors may represent characteristics of the audio signal. In an embodiment, the feature vectors are computed by a front-end processing module of a device, such as the user device 210. The feature vectors may be determined using any technique known to one of skill in the art.

At block 408, a keyword model, a background model, and a competitor model are retrieved from an electronic data store. For example, the keyword model, the background model, and the competitor model may be retrieved from the local data store 250. In some embodiments, more than one competitor model may be stored in the electronic data store. Accordingly, some or all of the competitor models may be retrieved from the electronic data store. In some embodiments, the retrieval of the models may be performed when initializing the device and need not be performed each time an utterance is received.

At block 410, the feature vectors are mapped or aligned with states of the keyword model to obtain a first score. As described above, the feature vectors may be mapped or aligned with the HMM states of the keyword model to produce the first score. The first score may represent the likelihood that the HMM states of the keyword model gave rise to the feature vectors determined using the audio signal. The mapping or alignment may be performed using a Viterbi algorithm or any other technique known to one of skill in the art.

At block 412, the feature vectors may be mapped or aligned with the one or more states of the background model to obtain a second score. Like the first score, the second score may represent the likelihood that the one or more HMM states of the background model gave rise to the feature vectors determined using the audio signal. If the likelihood that the HMM states of the keyword model gave rise to the feature vectors is greater than the likelihood that the one or more HMM states of the background model gave rise to the feature vectors (e.g., the first score is greater than the second score), the routine 400 may proceed to block 414. On the other hand, if the opposite is true (e.g., the first score is less than the second score), then it may be determined that a keyword was not spoken. Thus, the routine 400 may skip to block 418 and end the keyword spotting process. In some embodiments, the scores for each of the models (keyword, background, and competitor) are determined simultaneously or near simultaneously.

At block 414, the feature vectors are mapped or aligned with states of the competitor model to obtain a third score. As described above, the feature vectors may be mapped or aligned with the HMM states of the competitor model to produce the third score. The third score may represent the likelihood that the HMM states of the competitor model gave rise to the feature vectors determined using the audio signal. The mapping or alignment may be performed using a Viterbi algorithm or any other technique known to one of skill in the art.

At block 416, a keyword may be identified using the first score, the second score, and/or the third score. In an embodiment, a keyword is identified if the first score is greater than the second score and the third score. A keyword may not be identified if the first score is less than the second score or the third score.

In a further embodiment, a keyword is identified using the first score, the second score, and/or the third score and a second set of scores. The second set of scores may include confidence scores produced by at least one classifier (e.g., a support vector machine (SVM), a random forest, a neural network, etc.). As an example, a confidence score is produced by extracting properties (e.g., duration of phonemes, likelihood of phonemes, likelihood of each state, etc.) from an alignment of the feature vectors with a keyword model or a competitor model (e.g., from the alignments of blocks 410 or 414). In an embodiment, if the first score is greater than the second score (e.g., the likelihood that the HMM states of the keyword model gave rise to the feature vectors is greater than the likelihood that the HMM states of the background model gave rise to the feature vectors), then a classifier corresponding to a keyword may be used to produce a confidence score by extracting properties from the alignment of the feature vectors with the keyword model. If the third score is greater than the second score (e.g., the likelihood that the HMM states of the competitor model gave rise to the feature vectors is greater than the likelihood that the HMM states of the background model gave rise to the feature vectors), then a classifier corresponding to a competitor word may also be used to produce a confidence score by extracting properties from the alignment of the feature vectors with the competitor model. The same pattern applies to any further competitor models that are used during the alignment, as discussed below.

A confidence score may indicate that a keyword or a competitor word was spoken. In an embodiment, once some or all of the appropriate confidence scores have been produced, the confidence scores are compared to determine whether a keyword is identified. For example, a keyword is identified if the confidence score produced by a classifier corresponding to a keyword is higher than the confidence scores produced by the classifiers corresponding to the competitor words (e.g., it is more likely that a word corresponding to the feature vectors is the keyword than any competitor word). A keyword may not be identified if the confidence score produced by the classifier corresponding to the keyword is less than any confidence score produced by any classifier corresponding to any competitor word.

In still further embodiments, a keyword is identified using the first score, the second score, the third score and/or a fourth score. The fourth score may include a confidence score produced by a single classifier (e.g., an SVM, a random forest, a neural network, etc.) that is trained based on the keyword and some or all competitor words. As an example, the confidence score is produced by concatenating the properties extracted from the alignment of the feature vectors with the keyword model and one or more competitor models (e.g., from the alignments of blocks 410 and 414). The confidence score may indicate that the keyword was spoken. A keyword is identified if the confidence score is above a predetermined threshold. A keyword may not be identified if the confidence score is below the predetermined threshold.

In other embodiments, the feature vectors are mapped or aligned with states of a plurality of competitor models to obtain a plurality of competitor scores (e.g., a second, third, and fourth scores, etc.). A comparison of the first score and the second score may determine whether additional competitor models are used. In an embodiment, if the first score is greater than the second score, additional competitor models may be used until a score is obtained that is greater than the first score or until all competitor models have been used. A keyword is identified if the first score is greater than all other obtained scores. A keyword is not identified if the first score is less than any other obtained score. In some embodiments, all competitor models may be evaluated simultaneously or near simultaneously.

In further embodiments, not shown, if a keyword is identified, the audio signal corresponding to the keyword and/or a surrounding portion of the audio signal may be transmitted to another device, such as the speech recognition server device 240. In further embodiments, not shown, if a keyword is identified, an operation may be performed. As described above, operations may include toggling a light switch, activating an audio player, initiating a phone call, or the like. After a keyword is or is not identified based on a comparison of the first score and the second score, the keyword spotting process may be complete, as shown in block 418.

Word Model Generation

Figure 5:
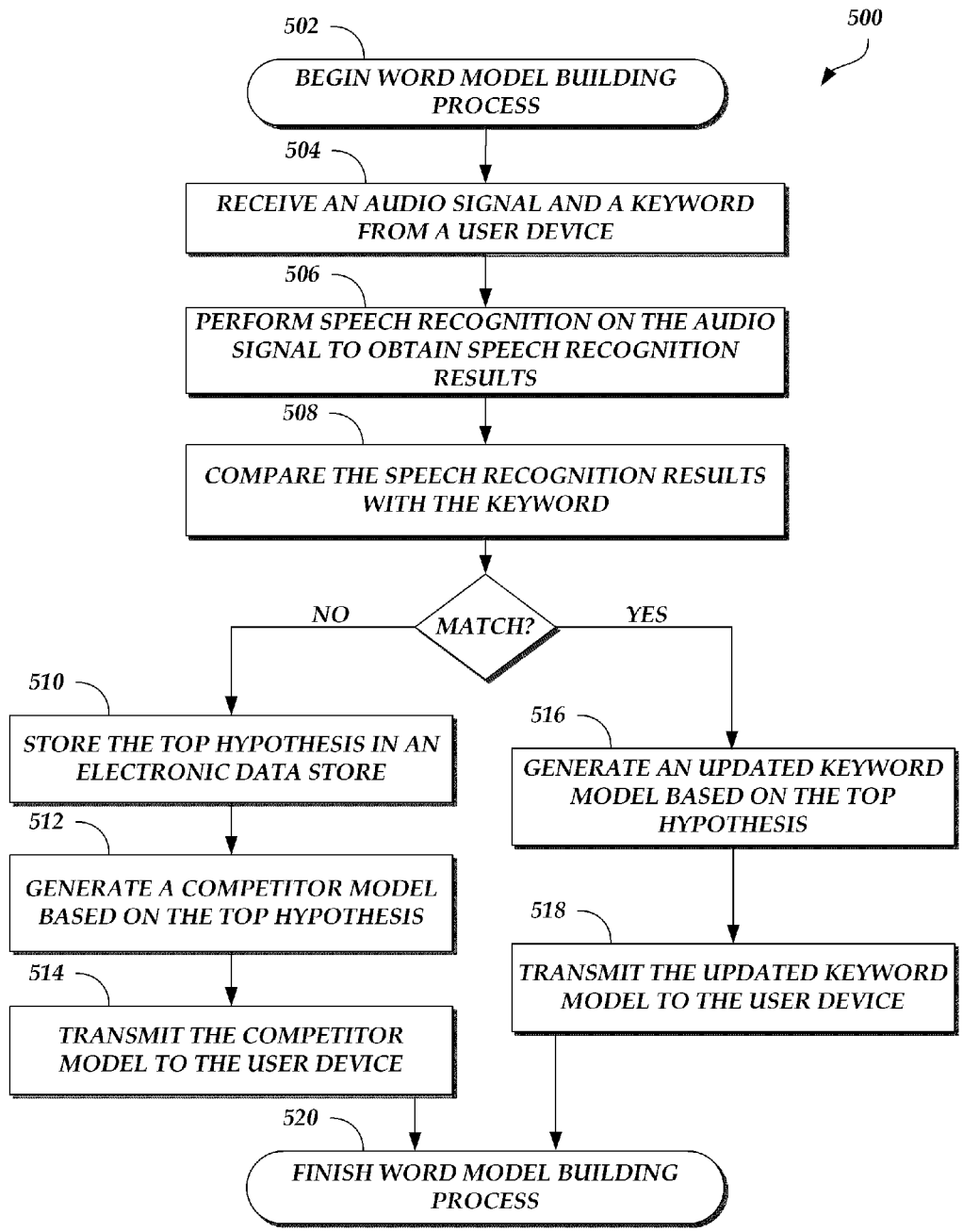
FIG. 5 is flow diagram depicting an illustrative routine for building a word model.

As described above, a device, such as the speech recognition server device 240 may perform speech recognition and/or generate word models based on the speech recognition results. FIG. 5 illustrates a routine 500 for building such word models. In an embodiment, a word model may include an updated keyword model or a new competitor model. A speech recognition server device 240, as described herein with respect to FIG. 2, may be configured to execute the routine 500. The routine 500 begins at block 502. The routine 500 may be an interactive routine initiated on demand by a user or an automated routine, such as might be executed on a periodic or aperiodic schedule. At block 502, the routine 500 begins the word model building process.

At block 504, an audio signal and a keyword is received. As discussed above, the audio signal may include a portion of an utterance received by a device, such as the user device 210, that corresponds with an identified keyword. The audio signal may also include a portion of the utterance that surrounds the identified keyword.

At block 506, speech recognition is performed on the audio signal to obtain speech recognition results. In an embodiment, the speech recognition results may include a lattice of words or an N-best list. In some embodiments, the speech recognition results may be verified by a person.

At block 508, the speech recognition results are compared with the keyword, and several actions may be taken based on the results of the comparison. For example, suppose the speech recognition results are a top-N list of hypotheses. Where the top hypothesis is a word that is different from the keyword, a competitor model may be created for the recognized word to prevent similar false recognitions of the keyword in the future. Where the top hypothesis is the same as the keyword, the model for the keyword may be updated or no action may be taken. For example, where the top hypothesis is the same as the keyword but with low confidence or where a score for the top hypothesis is close to the score of the second hypothesis, the model for the keyword may be updated to improve discrimination of the keyword. Where the top hypothesis is the same as the keyword and with high confidence or where the score for the top hypothesis is much larger than the score for the second hypothesis, no action may be taken as any action may be unlikely to further improve the model for the keyword.

In some embodiments, if the top hypothesis is a word that is different from the keyword, the routine 500 proceeds to blocks 510, 512, and 514. However, if the top hypothesis is a word that is the same as the keyword, the routine 500 proceeds to blocks 516 and 518.

At block 510, the top hypothesis is stored in an electronic data store. For example, the top hypothesis and/or the audio (or feature vectors) corresponding to the top hypothesis may be stored in the global data store 260. In an embodiment, a confidence score may be associated with the top hypothesis. The confidence score may be generated when speech recognition is performed, such as in block 506. The confidence score may also be stored in the global data store 260.

In further embodiments, not shown, an entry of the electronic data store may be associated with a user and/or a user device 210. The top hypothesis, audio, and the confidence score then may be stored in the appropriate entry. In an embodiment, if the entry already includes the top hypothesis, a count associated with the top hypothesis may be increased to reflect the fact that it has again been falsely identified as a keyword. The entry may also be updated to include the confidence score.

In some embodiments, not shown, if the top hypothesis has been falsely identified as the keyword a predetermined number of times (e.g., 10) with a confidence score that exceeds a predetermined value (e.g., 95%), the routine 500 proceeds to block 512. For example, if the top hypothesis occurs 10 times with a confidence score greater than 95%, then the routine 500 proceeds to block 512. Otherwise, the routine 500 proceeds to block 520 and the word model building process ends. For example, if the top hypothesis occurs 10 times, but only 5 times with a confidence score greater than 95%, then the routine 500 proceeds to block 520.

At block 512, a competitor model based on the top hypothesis is generated. As described above, the competitor model may include one or more HMM states that together represent the recognized word. The competitor model may be generated using any technique known to one of skill in the art.

At block 514, the competitor model is transmitted to the user device 210. As described above, the user device 210 uses the competitor model during subsequent keyword spotting.

At block 516, an updated keyword model is generated using the top hypothesis. In some embodiments, not shown, a confidence score of the top hypothesis, a confidence score of at least one other hypothesis, and/or a pronunciation of the keyword and the top hypothesis are analyzed before generating an updated keyword model. For example, an updated keyword model may be generated if the confidence score is high or if the score for the top hypothesis is much larger than the score for the second hypothesis. An updated keyword model may also be generated if a difference in pronunciation exists. The difference in pronunciation may be determined automatically by the speech recognition server device 240. The difference may also be determined by a person that listens to the audio signal and compares it to the keyword. For example, if no difference in pronunciation is detected, if the confidence score is high, and/or if the score for the top hypothesis is much larger than the score for the second hypothesis, the routine 500 may skip block 516 and proceeds to block 520 to end the word model building process. If a difference in pronunciation is detected, the confidence score is low, and/or if the score for the top hypothesis is close to the score for the second hypothesis, the routine 500 may continue to blocks 516 and 518.

In an embodiment, the updated keyword model may be similar to the original keyword model used by the user device 210. However, the updated keyword model takes into account the difference in pronunciation between the keyword and the top hypothesis. For example, the updated keyword model may include one or more additional HMM states that together represent the different pronunciation of the top hypothesis. The updated keyword model may be generated using any technique known to one of skill in the art.

At block 518, the updated keyword model is transmitted to the user device 210. As described above, the user device 210 uses the updated keyword model in place of the original keyword model during subsequent keyword spotting. After the competitor model or the updated keyword model has been transmitted to the user device 210, the word model building process may be complete, as shown in block 520.

Example Keyword Spotting Results

Figure 6:
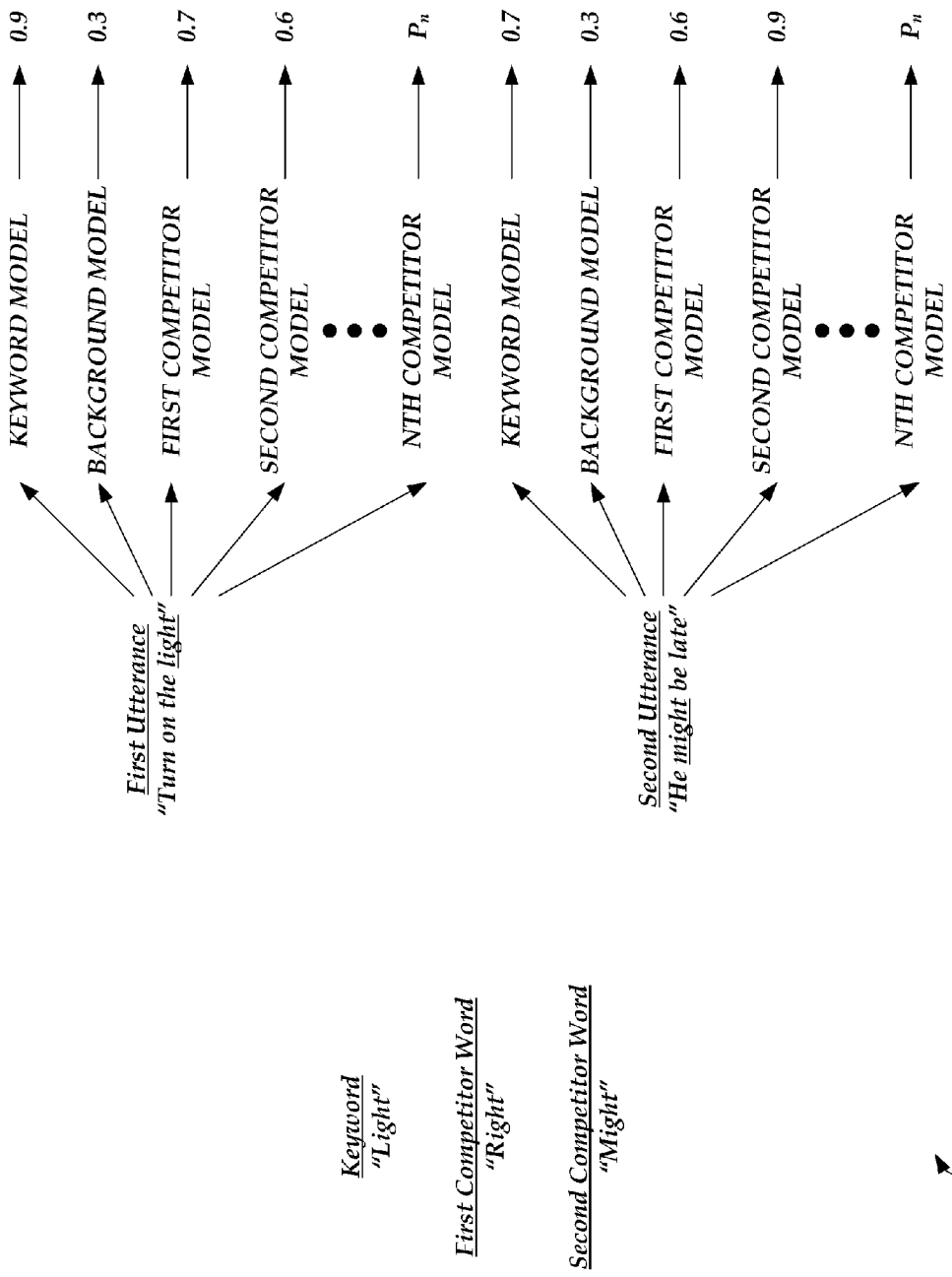
FIG. 6 is a diagram depicting keyword spotting results using a plurality of competitor models.

FIG. 6 is a diagram 600 illustrating various keyword spotting results determined by using a plurality of competitor models. As illustrated in FIG. 6, the actual keyword is "light," a first competitor word is "right," and a second competitor word is "might." The first competitor model corresponds to the first competitor word and the second competitor model corresponds to the second competitor word. For example, the first competitor model may include a sequence of one or more HMM states that together represent the word "right." Similarly, the second competitor model may include a sequence of one or more HMM states that together represent the word "might." FIG. 6 also illustrates that an additional number of competitor models (e.g., N competitor models) that may be used during keyword spotting.

FIG. 6 illustrates two example utterances upon which keyword spotting is performed. As described above, a keyword spotting device, such as the user device 210, may perform the keyword spotting. The first example shows the results of keyword spotting upon the utterance "turn on the light." The second example shows the results of keyword spotting upon the utterance "he might be late."

The utterance "turn on the light" represents a possible command and includes the keyword "light." As described above, the keyword spotting device may compute feature vectors using the utterance and map or align the feature vectors with the states of the different models. Mapping or aligning the feature vectors with the keyword model may produce a score of 0.9. The score may represent, for example, a score produced by the keyword model or a score produced by a classifier (e.g., an SVM) associated with the keyword. Similarly, mapping or aligning the feature vectors with the background model may produce a score of 0.3.

In an embodiment, the keyword spotting device compares the keyword score (e.g., 0.9) and the background score (e.g., 0.3). Since the keyword score is higher than the background score, the keyword spotting device determines that it is more likely that "light" was spoken rather than another word.

As described above, because the keyword score is higher, the keyword spotting device also compares scores with a score associated with a first competitor model. Mapping or aligning the feature vectors with the states of the first competitor model in the illustrated embodiment produces a score of 0.7. As discussed above, the score may represent a score produced by the first competitor model or a score produced by a classifier (e.g., an SVM) associated with the first competitor word. Since the first competitor score (e.g., 0.7) is less than the keyword score (e.g., 0.9), the keyword spotting device subsequently maps or aligns the feature vectors with the states of the second competitor model. However, if the first competitor score was greater than the keyword score (which it is not, in this example), the keyword spotting device would stop using any additional competitor models. In such a situation, the keyword spotting device would determine that it is more likely that "right" was spoken rather than "light".

As illustrated in FIG. 6, mapping or aligning the feature vectors with the states of the second competitor model may produce a score of 0.6. Again, the score may represent a score produced by the second competitor model or a score produced by a classifier (e.g., an SVM) associated with the second competitor word. Here, the score of 0.6 is less than the keyword score (0.9). If the scores produced by applying all additional competitor models are also less than the keyword score, then the keyword spotting device ultimately determines that the keyword "light" was spoken. In some embodiments, if the keyword spotting device determines that "light" is spoken, the keyword spotting device turns on a light switch or performs a similar operation. However, if any of the scores produced by the additional competitor models are greater than the keyword score, then the keyword spotting device determines that "light" is not spoken. In some embodiments, the keyword spotting device performs no additional operations.

In some embodiments, the keyword spotting device may perform the mapping or aligning of the feature vectors against all of the models simultaneously or near simultaneously. Evaluating all of the models simultaneously may increase the required processing power of the device, but may also reduce latency in determining whether an utterance corresponds to the keyword.

In some embodiments, when the keyword spotting device determines that a keyword is spoken, the keyword spotting device transmits a portion of the utterance to another device, such as the speech recognition server device 240. Specifically, the keyword spotting device transmits at least the portion of the utterance corresponding to "light" to the speech recognition server device 240.

FIG. 6 also illustrates an example model-comparison scoring outcome when a second utterance, "He might be late," is spoken by the user and detected by a keyword spotting device. The utterance "he might be late" does not represent a command, or keyword. In addition, the utterance includes a competitor word, "might." Mapping or aligning the feature vectors of "might" with the keyword model may produce a score of 0.7. Similarly, mapping or aligning the feature vectors of "might" with a background model (e.g., a UBM) may produce a score of 0.3.

In an embodiment, the keyword spotting device compares the keyword score (e.g., 0.7) and the background score (e.g., 0.3). Since the keyword score is higher than the background score, the keyword spotting device determines that it is more likely the HMM states of the keyword model gave rise to the feature vectors (e.g., it is more likely "light" was spoken rather than a generic word). If the keyword spotting device does not use a competitor model, the keyword spotting device would falsely identify "might" as the keyword "light."

However, since the keyword score is higher than the background model score, the keyword spotting device subsequently generates another score based upon the first competitor model. Mapping or aligning the feature vectors with the states of the first competitor model produces a score of 0.6. As described above, since the first competitor score (e.g., 0.6) is less than the keyword score (e.g., 0.7), the keyword spotting device maps or aligns the feature vectors with the states of the second competitor model. If only this one competitor model was used, the keyword spotting device would again falsely identify "might" as the keyword "light."

However, a second competitor model provides better results. In the illustrated embodiment, mapping or aligning the feature vectors of "might" with the states of a second competitor model produces a score of 0.9, which is greater than the keyword score. Because the second competitor score (e.g., 0.9) is greater than the keyword score, the keyword spotting device determines that the keyword "light" has not been spoken. In some embodiments, the keyword spotting device performs no additional operations. As noted above, in some embodiments, the keyword spotting device may evaluate all models simultaneously or near simultaneously to decrease latency.

However, if the keyword spotting device instead determined that the keyword had been spoken, the keyword spotting device may transmit a portion of the utterance to another device, such as the speech recognition server device 240. Specifically, the keyword spotting device transmits the portion of the utterance corresponding to "might be late" (e.g., the keyword and subsequent words) to the speech recognition server device 240.

Keyword Spotting Device

Figure 7:
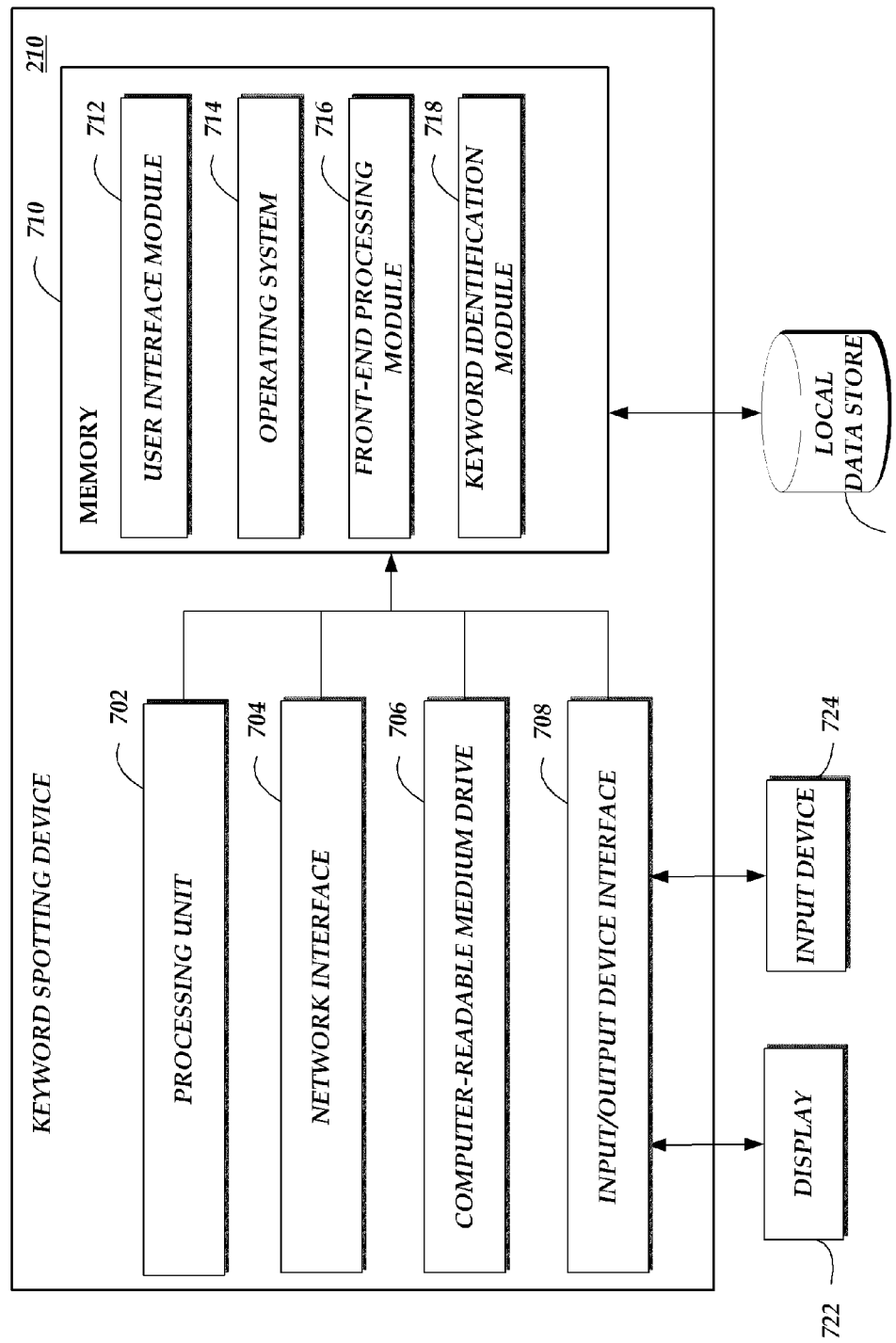
FIG. 7 is a schematic diagram of an illustrative keyword spotting device.

FIG. 7 is a schematic diagram of a keyword spotting device, such as user device 210. The keyword spotting device includes an arrangement of computer hardware and software components that may be used to implement aspects of the present disclosure. Those skilled in the art will appreciate that the keyword spotting device may include more (or fewer) components than those shown in FIG. 7. It is not necessary, however, that all of these generally conventional components be shown in order to provide an enabling disclosure.

The keyword spotting device includes a processing unit 702, a network interface 704, a non-transitory computer-readable medium drive 706, and an input/output device interface 708, all of which may communicate with one another by way of a communication bus. As illustrated, keyword spotting device is optionally associated with, or in communication with, a display 722 and an input device 724. The display 722 and input device 724 may be used in embodiments in which users interact directly with the keyword spotting device. The network interface 704 may provide the keyword spotting device with connectivity to one or more networks or computing systems. The processing unit 702 may thus receive information and instructions (such as utterances, language models, word models, and text) from other computing systems or services via a network. The processing unit 702 may also communicate to and from memory 710 and further provide output information for a display 722 via the input/output device interface 708. The input/output device interface 708 may accept input from the input device 724, such as a keyboard, mouse, digital pen, touch screen, or gestures recorded via motion capture. The input/output device interface 724 may also output audio data to speakers or headphones (not shown) or receive audio input (such as an utterance) from a microphone or receiver.

The memory 710 may contain computer program instructions that the processing unit 702 may execute in order to implement one or more embodiments of the present disclosure. The memory 710 generally includes RAM, ROM and/or other persistent or non-transitory computer-readable storage media. The memory 710 may store an operating system 714 that provides computer program instructions for use by the processing unit 702 in the general administration and operation of the keyword spotting device. The memory 710 may further include other information for implementing aspects of the present disclosure. For example, in one embodiment, the memory 710 includes a user interface module 712 that facilitates generation of user interfaces (such as by providing instructions therefor) for display upon a computing device.

In addition, memory 710 may optionally include or communicate with the local data store 726. The local data store 726 may contain models, such as a keyword model, background model, and a competitor model. The local data store 726 may be embodied in hard disk drives, solid state memories, and/or any other type of non-transitory computer-readable storage medium accessible to the keyword spotting device. The local data store 726 may also be distributed or partitioned across multiple storage devices as is known in the art without departing from the spirit and scope of the present disclosure. In an embodiment, the local data store 726 may be similar to the local data store 250 as illustrated with respect to FIG. 2.

In addition to the user interface module 712, the memory 710 may include a front-end processing module 716. In one embodiment, the front-end processing module 716 implements aspects of the present disclosure. For example, the front-end processing module 716 may be configured to compute feature vectors from the audio data.

In addition to the front-end processing module 716, the memory 710 may include a keyword identification module 718. In one embodiment, the keyword identification module 718 implements aspects of the present disclosure. For example, the keyword identification module 718 may be configured to map or align the computed feature vectors with the one or more states of the different word models (e.g., the keyword model, the background model, a first competitor model, etc.). The keyword identification module 710 may also be configured to compare the scores produced by the mapping or aligning and determine whether a keyword is spoken.

The keyword spotting device may be embodied in a variety of environments, and may be represented as a single computing device or as multiple computing devices. In still other embodiments, the keyword spotting device may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, clock, audiobook player, digital media player, video game console, in-store kiosk, television, one or more processors, integrated components for inclusion in computing devices, appliances, electronic devices for inclusion in vehicles or machinery, gaming devices, or the like.

In some embodiments, the keyword spotting device may include some or all of the components discussed herein with respect to FIG. 7 and additional components, not shown. The keyword spotting device may include these additional components when embodied as a speech recognition server device, such as speech recognition server device 240.

For example, the keyword spotting device may include a speech recognition module that may be executed by a processing unit. In an embodiment, the speech recognition module implements aspects of the present disclosure. For example, the speech recognition module may receive an utterance and perform speech recognition on the utterance.

The keyword spotting device may also include a word model generation module that may be executed by a processing unit. In an embodiment, the word model generation module implements aspects of the present disclosure. For example, the word model generation module may generate a competitor model or an updated keyword model based on a word identified in the speech recognition results. The generated word models may be transmitted to the user device 210.

Terminology

Many of the operations of the present disclosure are sufficiently mathematically or technically complex that one or more computing devices may be necessary to carry them out. For example, computing feature vectors, mapping or aligning feature vectors to states of a word model, and generating word models effectively requires resort to a computing device owing to the volume and complexity of the calculations involved. Additionally, a computing device may also be required to communicate over a network.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A system comprising:
an electronic data store configured to store a keyword model that models a keyword and a competitor model that models a competitor word; and
a user device in communication with the electronic data store, the user device configured to:
receive a voice signal corresponding to a first utterance of a user;
compute feature vectors using the voice signal;
obtain a first score using the feature vectors and the keyword model, wherein the first score indicates a likelihood that the voice signal comprises the keyword;
obtain a second score using the feature vectors and the competitor model, wherein the second score indicates a likelihood that the voice signal comprises the competitor word;
determine that the voice signal comprises the keyword using the first score and the second score; and
transmit information identifying the keyword and a portion of the voice signal that corresponds to the keyword to a server device, wherein the server device is configured to:

perform speech recognition on the portion to obtain speech recognition results;

generate, using the speech recognition results, a model, wherein the model is one of an updated keyword model, an updated competitor model, or a second competitor model; and transmit the generated model to the user device; and store the generated model in the electronic data store.

2. The system of claim 1, wherein the keyword model comprises a hidden Markov model and a Gaussian mixture model, and wherein the user device is further configured to obtain the first score using a Viterbi algorithm.

3. The system of claim 1, wherein the user device is further configured to determine that the voice signal comprises the keyword using a support vector machine.

4. The system of claim 1, wherein the speech recognition results do not comprise the keyword, wherein the speech recognition results do not comprise the competitor word, wherein the generated model is the second competitor model, and wherein the second competitor model models a word in the speech recognition results.

5. The system of claim 1, wherein the speech recognition results comprise the keyword, and wherein the generated model is the updated keyword model.

6. The system of claim 1, wherein the electronic data store is further configured to store a background model, and wherein the user device is further configured to:

obtain a third score using the feature vectors and the background model; and determine that the voice signal comprises the keyword using the third score.

7. A computer-implemented method, comprising:

as implemented by one or more computing devices configured with specific computer-executable instructions, receiving a voice signal corresponding to a first utterance;

obtaining a first score using the voice signal and a keyword model, wherein the first score indicates a degree of similarity between the voice signal and a keyword;

obtaining a second score using the voice signal and a competitor model, wherein the second score indicates a degree of similarity between the voice signal and a competitor word;

determining that the voice signal comprises the keyword using the first score and the second score; and transmitting the keyword and a portion of the voice signal that corresponds to the keyword to a second device configured to perform speech recognition on the portion and configured to provide, based on the performed speech recognition, one of an updated keyword model or a second competitor model.

8. The computer-implemented method of claim 7, further comprising:

computing feature vectors using the voice signal;

wherein the keyword model comprises a hidden Markov model (HMM) and a Gaussian mixture model; and wherein obtaining the first score comprises using a Viterbi algorithm to align the feature vectors with states of the HMM.

9. The computer-implemented method of claim 7, wherein obtaining the first score using the voice signal comprises using a support vector machine.

10. The computer-implemented method of claim 7, wherein the model is one of an updated keyword model or a second competitor model.

11. The computer-implemented method of claim 7, wherein determining that the voice signal comprises the keyword using the first score and the second score comprises determining that the first score is greater than the second score.

12. The computer-implemented method of claim 7, further comprising:

obtaining a third score using the voice signal and a background model; and wherein determining that the voice signal comprises the keyword further comprises using the third score.

13. The computer-implemented method of claim 7, wherein the first score indicates a likelihood that the voice signal comprises the keyword, and wherein the second score indicates a likelihood that the voice signal comprises the competitor word.

14. A non-transitory computer-readable medium comprising one or more modules configured to execute in one or more processors of a computing device, the one or more modules being further configured to:

receive a voice signal corresponding to a first utterance;

obtain a first score using the voice signal and a keyword model, wherein the first score indicates a degree of similarity between the voice signal and a keyword;

obtain a second score using the voice signal and a competitor model, wherein the second score indicates a degree of similarity between the voice signal and a competitor word;

determine that the voice signal comprises the keyword using the first score and the second score; and transmit the keyword and a portion of the voice signal that corresponds to the keyword to a second device configured to perform speech recognition on the portion and configured to provide a model based on the performed speech recognition.

15. The non-transitory computer-readable medium of claim 14, wherein the one or more modules are further configured to:

compute feature vectors using the voice signal;

obtain the first score using a Viterbi algorithm to align the feature vectors with states of a hidden Markov model corresponding to the keyword.

16. The non-transitory computer-readable medium of claim 14, wherein the one or more modules are further configured to obtain the first score using a support vector machine.

17. The non-transitory computer-readable medium of claim 14, wherein the model is one of an updated keyword model or a second competitor model.

18. The non-transitory computer-readable medium of claim 14, wherein the one or more modules are configured to determine that the voice signal comprises the keyword by determining that the first score is greater than the second score.

19. The non-transitory computer-readable medium of claim 14, wherein the one or more modules are further configured to:

obtaining a third score using the voice signal and a background model; and wherein determining that the voice signal comprises the keyword further comprises using the third score.

20. The non-transitory computer-readable medium of claim 14, wherein the first score indicates a likelihood that the voice signal comprises the keyword, and wherein the second score indicates a likelihood that the voice signal comprises the competitor word.

21. A system comprising:
a memory storing specific computer-executable instructions; and
a processor configured to execute the specific computer-executable instructions, wherein execution of the specific computer-executable instructions by the processor causes the system to:
receive, from a user device, a voice signal and a keyword identified by a keyword model as corresponding to the voice signal;
perform speech recognition on the voice signal to obtain speech recognition results;
determine that the speech recognition results do not comprise the keyword; and
determine a competitor model, wherein the competitor model models a competitor word, and wherein the speech recognition results comprise the competitor word.

22. The system of claim 21, wherein execution of the specific computer-executable instructions further causes the system to transmit the competitor model to the user device.

23. The system of claim 21, wherein the competitor model comprises a hidden Markov model.

24. The system of claim 21, further comprising an electronic data store, wherein execution of the specific computer-executable instructions further causes the system to store the competitor word and a number of times the competitor word is falsely identified as the keyword in the electronic data store.

25. The system of claim 24, wherein execution of the specific computer-executable instructions further causes the system to:
determine that the competitor word is falsely identified as the keyword greater than a predetermined number of times.

26. The system of claim 21, wherein execution of the specific computer-executable instructions further causes the system to:
receive a second voice signal;
perform speech recognition on the voice signal to obtain second speech recognition results;
determine that the second speech recognition results comprise the keyword;
generate an updated keyword model; and
transmit the updated keyword model to the user device.

27. A computer-implemented method, comprising:
as implemented by one or more computing devices configured with specific computer-executable instructions,
receiving, from a user device, a voice signal and a keyword identified by a keyword model as corresponding the voice signal;
performing speech recognition on the voice signal to obtain speech recognition results;
determining that the speech recognition results do not comprise the keyword; and
determining a competitor model, wherein the competitor model models a competitor word, and wherein the speech recognition results comprise the competitor word.

28. The computer-implemented method of claim 27, further comprising transmitting the competitor model to the user device.

29. The computer-implemented method of claim 27, wherein the competitor model comprises a hidden Markov model.

30. The computer-implemented method of claim 27, further comprising storing the competitor word and a number of times the competitor word is falsely identified as the keyword.

31. The computer-implemented method of claim 27, further comprising:
determining that the competitor word is falsely identified as the keyword greater than a predetermined number of times.

32. The computer-implemented method of claim 27, further comprising:
receiving a second voice signal from the user device;
performing speech recognition on the voice signal to obtain second speech recognition results;
determining that the second speech recognition results comprise the keyword;
generate an updated keyword model; and
transmitting the updated keyword model to the user device.

* * * * *

UNITED STATES PATENT AND TRADEMARK OFFICE
CERTIFICATE OF CORRECTION

PATENT NO. : 9,159,319 B1  
APPLICATION NO. : 13/692775  
DATED : October 13, 2015  
INVENTOR(S) : Bjorn Hoffmeister Page 1 of 1

It is certified that error appears in the above-identified patent and that said Letters Patent is hereby corrected as shown below:

In The Claims

In column 22 at line 5 (approx.), In Claim 27, before "the" insert --to--.

Signed and Sealed this  
Twenty-third Day of August, 2016

Michelle K. Lee  
*Director of the United States Patent and Trademark Office*